(12) United States Patent
Cai

(10) Patent No.: US 9,988,287 B2
(45) Date of Patent: Jun. 5, 2018

(54) PROCESS WATER FOR PRODUCING SALT BY MEANS OF STRONG BRINE CONCENTRATION AFTER SEA WATER DESALINATION BY USING A TWO-WAY CIRCULATION METHOD AND BROMINE EXTRACTION

(71) Applicant: WEIFANG NORTHSEA OASIS SOLAR POWERED TECHNOLOGY CO., LTD., Weifang, Shandong Province (CN)

(72) Inventor: Panmin Cai, Weifang (CN)

(73) Assignee: WEIFANG NORTHSEA OASIS SOLAR POWERED TECHNOLOGY CO., LTD., Weifang (CN)

( * ) Notice: Subject to any disclaimer, the term of this patent is extended or adjusted under 35 U.S.C. 154(b) by 0 days. days.

(21) Appl. No.: 15/128,603

(22) PCT Filed: Jan. 4, 2015

(86) PCT No.: PCT/CN2015/000002
§ 371 (c)(1),
(2) Date: Sep. 23, 2016

(87) PCT Pub. No.: WO2015/184789
PCT Pub. Date: Dec. 10, 2015

(65) Prior Publication Data
US 2017/0152160 A1    Jun. 1, 2017

(30) Foreign Application Priority Data

Jun. 6, 2014 (CN) .......................... 2014 1 0248591

(51) Int. Cl.
C02F 1/44     (2006.01)
C01F 5/30     (2006.01)
(Continued)

(52) U.S. Cl.
CPC ............ C02F 1/441 (2013.01); B01D 61/025 (2013.01); C01B 7/096 (2013.01); C01B 35/121 (2013.01);
(Continued)

(58) Field of Classification Search
CPC ..... B01D 61/025; C01B 35/121; C01B 7/096; C01D 3/06; C01F 5/30; C02F 1/441; C02F 2103/08
See application file for complete search history.

(56) References Cited

U.S. PATENT DOCUMENTS

| 4,019,896 A * | 4/1977 | Appleby ................ B01D 53/34 110/215 |
| 2006/0060532 A1* | 3/2006 | Davis ................... B01D 61/022 210/652 |
| 2015/0086452 A1* | 3/2015 | Worsley ................... C01D 1/22 423/192 |

FOREIGN PATENT DOCUMENTS

| CN | 101214976 A | 7/2008 |
| CN | 101234767 A | 8/2008 |

(Continued)

OTHER PUBLICATIONS

Apr. 16, 2015 Search Report issued in International Patent Application No. PCT/CN2015/000002.

Primary Examiner — Ngoc-Yen Nguyen
(74) Attorney, Agent, or Firm — Oliff PLC

(57) ABSTRACT

A process produces salt by way of strong brine concentration after sea water desalination by using a two-way circulation method and bromine extraction. The process includes the following steps: A, preparing fresh water and strong brine from sea water in a high-pressure reverse osmosis unit by using a reverse osmosis method, wherein the concentration of the prepared strong brine is 70000 to 80000 PPM; and B, performing fresh and concentrated separation on the strong (Continued)

brine with the concentration of 70000 to 80000 PPM in a two-way circulation manner by using a concentration difference method till the strong brine is crystallized.

6 Claims, 2 Drawing Sheets

(51) Int. Cl.
    *C01D 3/06*     (2006.01)
    *C01B 7/09*     (2006.01)
    *C01B 35/12*     (2006.01)
    *B01D 61/02*     (2006.01)
    *C02F 103/08*     (2006.01)

(52) U.S. Cl.
    CPC ................ *C01D 3/06* (2013.01); *C01F 5/30* (2013.01); *C02F 2103/08* (2013.01)

(56) References Cited

FOREIGN PATENT DOCUMENTS

| CN | 102765781 A | 11/2012 |
| CN | 104030320 A | 9/2014 |

* cited by examiner

PROCESS WATER FOR PRODUCING SALT BY MEANS OF STRONG BRINE CONCENTRATION AFTER SEA WATER DESALINATION BY USING A TWO-WAY CIRCULATION METHOD AND BROMINE EXTRACTION

TECHNICAL FIELD

The present invention relates to a process for separating and extracting salt, bromine, potassium chloride and magnesium chloride from sea water, particularly a process for producing salt by means of strong brine concentration after sea water desalination by using a two-way circulation method and bromine extraction, and it belongs to the technical field of sea water desalination coupled with industrial salt production.

BACKGROUND TECHNOLOGY

The current salt pan solar evaporation technology method is disadvantaged by large floor space, low production efficiency, high cost and poor quality. However, the sea water desalination engineering implemented in areas in shortage of fresh water will cause pollution due to external discharge of strong brine cannot be utilized after extraction of fresh water since the water preparation cost is high and is unable to adapt to the market price.

CONTENT OF INVENTION

The problem to be solved in the present invention is to provide a process for producing salt by means of strong brine concentration after sea water desalination by using a two-way circulation method and bromine extraction which can reduce the current production cost of fresh water, salt and bromine, improve quality and protect environment.

In order to solve the aforesaid problems, the present invention adopts the following technical solution:

A process for producing salt by means of strong brine concentration after sea water desalination by using a two-way circulation method and bromine extraction, comprising the following steps:

A. Preparing fresh water and strong brine from sea water in a high-pressure reverse osmosis unit by using a reverse osmosis method, wherein the concentration of the prepared strong brine is 70000~80000 PPM;

B. Performing fresh and concentrated separation on the strong brine with the concentration of 70000~80000 PPM in a two-way circulation manner by using a concentration difference method till the strong brine is crystallized.

The following is a further optimization of the aforesaid solution:

The aforesaid technology also includes the following step:

C. In the process of performing fresh and concentrated separation on the strong brine, extracting the magnesium chloride, potassium chloride and bromine in strong brine in sequence.

Further optimization:

In the said Step B, the process of performing fresh and concentrated separation in a two-way circulation manner by using a concentration difference method includes the following steps:

a. Setting several 12 m deep brine tanks and numbering them: I-XVII; divide every brine tank into three areas, among which the upper 4 m is low salinity area, the middle 4 m is medium salinity area and the lower 4 m is high salinity area; separating concentration difference of every area is 0.2~1.5°, and the concentration difference of the same area of neighboring brine tanks is 1~3°; the several brine tanks are divided into salt areas with the brine concentration of 4-29°;

b. Firstly, inject the strong brine with the concentration of 70000~80000 ppm in the location 6 m deep in brine tank XV with the concentration of 7° in the medium salinity area;

c. Then, slowly pump the brine at the bottom of every brine tank into the medium salinity area of the upper brine tank with high salt content, and the brine of low concentration at the top of the upper brine tank will overflow to the lower brine tank, forming a two-way circulation;

d. After the crystallization of sodium chloride at around 29°, extracting sodium chloride crystals in the strong brine area at 27~29°.

Further optimization:

In the aforesaid technology, magnesium chloride is extracted with a physical method and the extraction is performed in the 14~16° strong brine area; after the crystallization of magnesium chloride at around 15°, magnesium chloride crystals are extracted.

Further optimization:

In the aforesaid technology, potassium chloride is extracted with a physical method and the extraction is performed in the 25~26° strong brine area; after the crystallization of potassium chloride at around 25°, potassium chloride crystals are extracted.

Further optimization:

In the aforesaid technology, the extraction technology of bromine is performed in brine tanks III and IV, and the steps are as follows:

1) Introduce chlorine into the strong brine to blow bromine out, and the reaction formula is as follows:

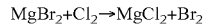
$$MgBr_2 + Cl_2 \rightarrow MgCl_2 + Br_2$$

2) The bromine is absorbed by alkali liquor and is fixed in the form of sodium bromate, and the reaction formula is as follows:

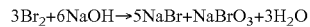
$$3Br_2 + 6NaOH \rightarrow 5NaBr + NaBrO_3 + 3H_2O$$

3) Bromine can be obtained from the aqueous solution of sodium bromate through distillation after neutralizing treatment of sulfuric acid.

Further optimization:

The said bromine extraction adopts full-automatic super-gravity bromine extraction equipment and a chemical method, and the steps are as follows:

1) Respectively introduce strong brine and chlorine into the water distributor in the shell through the brine and chlorine inlets at the bottom of shell, and then they will enter the motor-driven rotating packed bed loaded with filler, and in the water distributor and rotating packed bed, bromine in strong brine will react with chlorine:

The reaction formula is as follows:

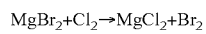
$$MgBr_2 + Cl_2 \rightarrow MgCl_2 + Br_2$$

Blow out the bromine generated after reaction through the fan and send it to the alkali liquor tank;

2) The bromine is absorbed by alkali liquor and is fixed in the form of sodium bromate, and the reaction formula is as follows:

$$3Br_2 + 6NaOH \rightarrow 5NaBr + NaBrO_3 + 3H_2O$$

3) Bromine can be obtained from the aqueous solution of sodium bromate through distillation after neutralizing treatment of sulfuric acid.

The present invention adopts the said solution, and it has the following advantages:

1. Through this invention, salt is produced from the strong brine by means of sea water desalination, solving the problem of contamination caused by discharge of strong brine after sea water desalination, and the yield of salt in unit area is 30~50 times of the yield of salt in a salt pan producing method, and the cost is far lower than that of salt pan production.

2. The quality of salt depends on purity. It is hard to extract magnesium chloride and potassium chloride with the salt pan producing, while the technical solution adopted in the present invention is convenient for the separation and extraction of magnesium chloride, potassium chloride and bromine, and it can realize effective separation of various inorganic salts, so the quality of salt is of high grade.

3. The bromine extraction by use of supergravity centrifuge at high salinity adopted in the present invention is in the highest level of the industry by virtue of its high efficiency, low cost, automation and safety.

The following figures and embodiments further illustrate the present invention.

Figure 1:
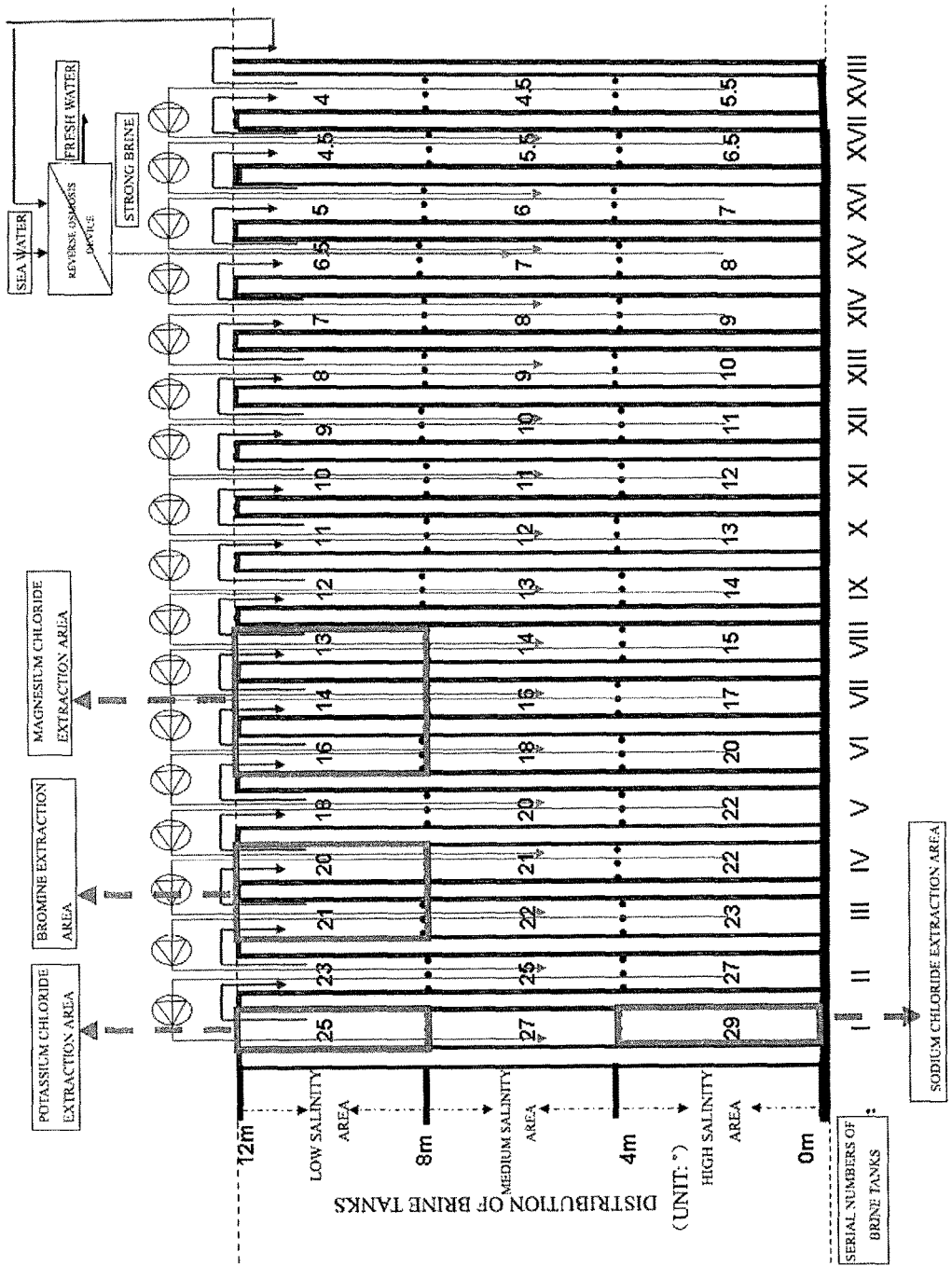
FIG. 1 is the flow diagram of embodiments 1-5 in the present invention.

Where, 1—Shell; 2—Rotating packed bed; 3—Fan; 4—Motor; 5—Chlorine and brine inlet; 6—Effluent outlet; 7—Alkali liquor tank; 8—Water distributor.

Specific Embodiments:

Embodiment 1, a process for producing salt by means of strong brine concentration after sea water desalination by using a two-way circulation method and bromine extraction, comprising the following steps:

A. Preparing fresh water and strong brine from sea water in a high-pressure reverse osmosis unit by using a reverse osmosis method, wherein the concentration of the prepared strong brine is 70000~80000 PPM (7~8°);

B. Performing fresh and concentrated separation on the strong brine with the concentration of 70000~80000 PPM in a two-way circulation manner by using a concentration difference method till the strong brine is crystallized.

C. In the process of performing fresh and concentrated separation on the strong brine, extracting the magnesium chloride, potassium chloride and bromine in strong brine in sequence.

In the said Step B, the process of performing fresh and concentrated separation in a two-way circulation manner by using a concentration difference method includes the following steps:

a. Setting several 12 m deep brine tanks and numbering them: I-XVII; divide every brine tank into three areas, among which the upper 4 m is low salinity area, the middle 4 m is medium salinity area and the lower 4 m is high salinity area; separating concentration difference of every area is 0.2~1.5°, and the concentration difference of the same area of neighboring brine tanks is 1~3°; the several brine tanks are divided into salt areas with the brine concentration of 4-29°;

The capacity of brine tank of every stage is 3~5 times of the daily brine output Q of anti-penetration equipment (keep the standing time above 70 h).

b. Firstly, inject the strong brine with the concentration of 70000~80000 ppm in the location 6 m deep in brine tank XV with the concentration of 7° in the medium salinity area;

c. Then, slowly pump the brine at the bottom of every brine tank into the medium salinity area of the upper brine tank with high salt content, and the brine of low concentration at the top of the upper brine tank will overflow to the lower brine tank, forming a two-way circulation.

d. After the crystallization of sodium chloride at around 29°, extracting sodium chloride crystals in the strong brine area at 27~29°.

Embodiment 2, in the said Embodiment 1, magnesium chloride is extracted with a physical method and the extraction is performed in the 14~16° strong brine area; after the crystallization of magnesium chloride at around 15°, magnesium chloride crystals are extracted.

Embodiment 3, in the said Embodiment 1, potassium chloride is extracted with a physical method and the extraction is performed in the 25~26° strong brine area; after the crystallization of potassium chloride at around 25°, potassium chloride crystals are extracted.

Embodiment 4, in the said Embodiment 1, the extraction technology of bromine is performed in the optimal brine tank (III and IV) after the demonstration of several tests, and the steps are as follows:

1) Introduce chlorine into the strong brine to blow bromine out, and the reaction formula is as follows:

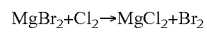

$MgBr_2+Cl_2 \rightarrow MgCl_2+Br_2$

2) The bromine is absorbed by alkali liquor and is fixed in the form of sodium bromate, and the reaction formula is as follows:

$3Br_2+6NaOH \rightarrow 5NaBr+NaBrO_3+3H_2O$

3) Bromine can be obtained from the aqueous solution of sodium bromate through distillation after neutralizing treatment of sulfuric acid.

Figure 2:
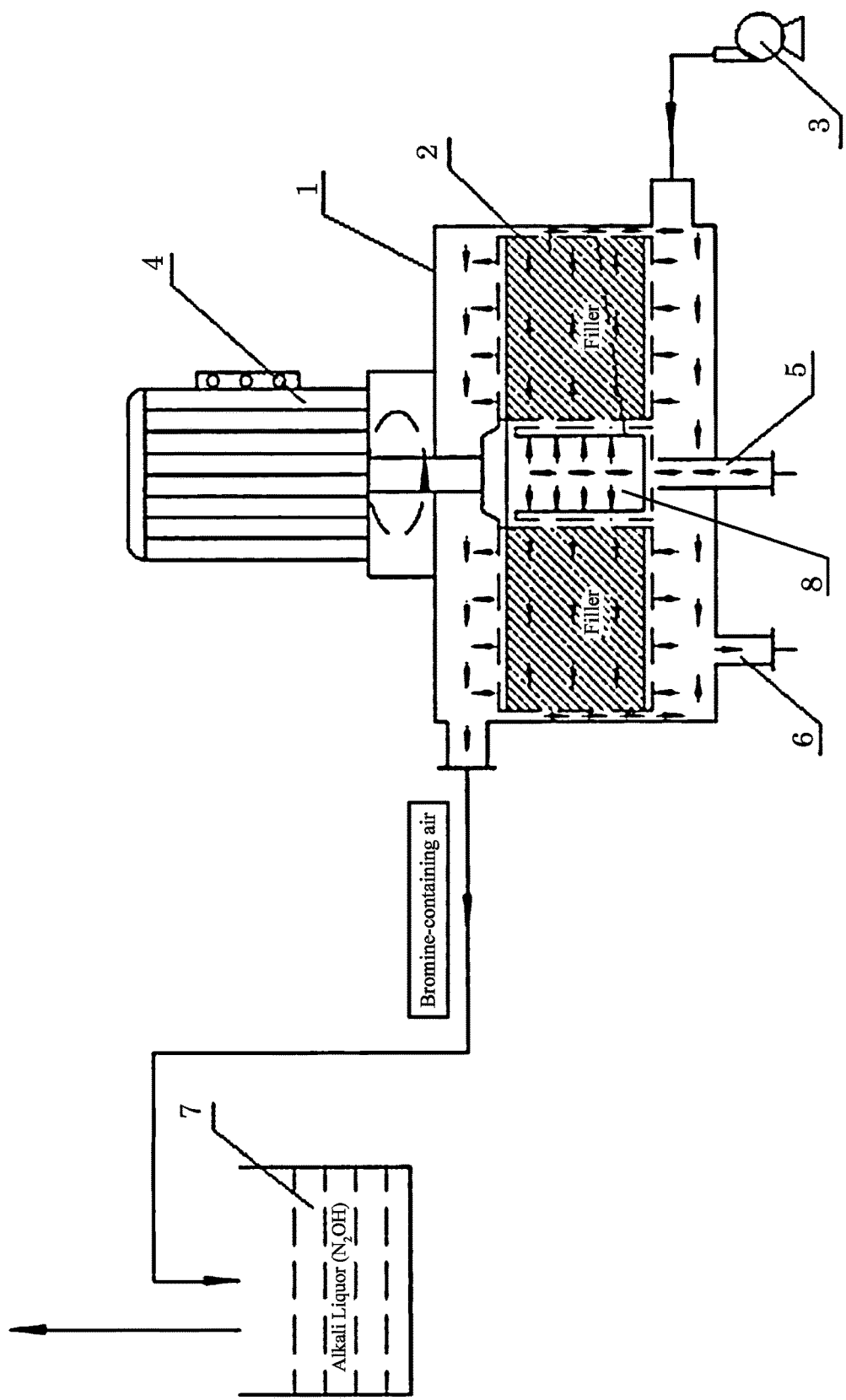
FIG. 2 is the schematic diagram of bromine extractor in embodiment 5 in the present invention.

Embodiment 5, in the said Embodiment 1, the said bromine extraction can adopt full-automatic supergravity bromine extraction equipment and a chemical method, as shown in FIG. 2:

1) Respectively introduce strong brine and chlorine into the water distributor 8 in Shell 1 through the brine and chlorine inlets 5 at the bottom of Shell 1, and then enter the rotating packed bed 2 loaded with filler driven by the motor 4, and in the water distributor 8 and rotating packed bed 2, bromine in strong brine will react with chlorine:

The reaction formula is as follows:

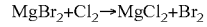

$MgBr_2+Cl_2 \rightarrow MgCl_2+Br_2$

Blow out the bromine generated after reaction through the fan 3 and send it to the alkali liquor tank 7;

2) The bromine is absorbed by alkali liquor and is fixed in the form of sodium bromate, and the reaction formula is as follows:

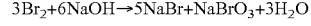

$3Br_2+6NaOH \rightarrow 5NaBr+NaBrO_3+3H_2O$

3) Bromine can be obtained from the aqueous solution of sodium bromate through distillation after neutralizing treatment of sulfuric acid.

A comparison between the refined salt produced by use of the said technology and the refined salt produced with other methods, and the comparison results are shown in the table below:

|  | Solar industrial salt | | | Refined industrial salt | | | Refined salt produced by use of this technology |
| --- | --- | --- | --- | --- | --- | --- | --- |
| Index | Premium | Grade I | Grade II | Premium | Grade I | Grade II | |
| Sodium chloride (%)≥ | 96.00 | 94.50 | 92.00 | 99.10 | 98.50 | 97.50 | 99.40 |
| Moisture (%)≤ | 3.00 | 4.10 | 6.00 | 0.30 | 0.50 | 0.80 | 0.20 |
| Water insoluble substance (%)≤ | 0.20 | 0.30 | 0.40 | 0.05 | 0.10 | 0.20 | 0.05 |
| Calcium and magnesium ion (%)≤ | 0.30 | 0.40 | 0.60 | 0.25 | 0.40 | 0.60 | 0.15 |
| Sulfate ion (%)≤ | 0.05 | 0.70 | 1.00 | 0.30 | 0.50 | 0.90 | 0.20 |

Through the aforesaid comparison, it can be known that the quality grade of salt produced by use of this technology is far higher than that of refined salt produced with other methods.

In the said embodiments, the number of stages of brine tanks depends on the required concentration of the final brine; if it is required to reach the concentration of salt crystallization, 18~20 stages shall be set (designed by increasing 1° per stage).

The invention claimed is:

1. A process for producing salt from strong brine produced from sea water desalination, comprising the following steps:
   A. preparing strong brine from sea water by a reverse osmosis method, wherein the concentration of the prepared strong brine is 7000~80000 PPM;
   B. separating the strong brine in a two-way circulation manner by using a concentration difference method till the strong brine is crystallized, wherein the two-way circulation manner by the concentration difference method includes the following steps:
   a. setting several 12 m deep brine tanks and numbering them: I-XVII, in which: every brine tank is divided into three areas, among which an upper 4 m is a low salinity area, a middle 4 m is a medium salinity area and a lower 4 m is a high salinity area; each area of the brine tanks are separated by a concentration difference of 0.2~1.5°, and a concentration difference of the same area of neighboring brine tanks is 1~3°; the brine tanks I-XVII are divided into salt areas with brine concentrations ranging from 4~29°; and the brine tanks I-XVII generally decrease in brine concentration;
   b. injecting the strong brine with the concentration of 7000~80000 PPM 6 m deep into brine tank XV having a concentration of 7° in the medium salinity area;
   c. pumping the brine at a bottom of every brine tank into the medium salinity area of an adjacent brine tank having higher salt content, and the brine of low concentration at a top of a brine tank having higher salt content will overflow to an adjacent brine tank having lower salt content, forming a two-way circulation;
   d. extracting sodium chloride crystals in a strong brine area at 27~29° after a crystallization of sodium chloride at around 29°.

2. The process according to claim 1, wherein the process also includes the following step:
   C. during the step of separating the strong brine, extracting the magnesium chloride, potassium chloride and bromine in strong brine in sequence.

3. The process according to claim 1, magnesium chloride is extracted with a physical method and the extraction is performed in a 14~16° strong brine area; after the crystallization of magnesium chloride at around 15°, magnesium chloride crystals are extracted.

4. The process according to claim 1, potassium chloride is extracted with a physical method and the extraction is performed in a 25~26° strong brine area; after the crystallization of potassium chloride at around 25°, potassium chloride crystals are extracted.

5. The process according to claim 1, the extraction technology of bromine is performed on brine from the brine tanks III and IV, and the steps are as follows:
   1) introduce chlorine into the strong brine to extract bromine out, and the reaction formula is as follows:

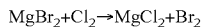

MgBr$_2$+Cl$_2$→MgCl$_2$+Br$_2$ 2) the bromine is absorbed by alkali liquor and is fixed in the form of sodium bromate, and the reaction formula is as follows:

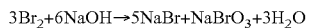

3Br$_2$+6NaOH→5NaBr+NaBrO$_3$+3H$_2$O 3) bromine is obtained from the aqueous solution of sodium bromate through distillation after neutralizing treatment of sulfuric acid.

6. The process according to claim 5, wherein the bromine extraction uses full-automatic supergravity bromine extraction equipment separate from the brine tanks and a chemical method, and the steps are as follows:
   1) introduce strong brine and chlorine into a water distributor in a shell through the brine and chlorine inlets at a bottom of the shell, and then enter a rotating packed bed loaded with filler driven by a motor, and in the water distributor and rotating packed bed, bromine in strong brine will react with chlorine to extract bromine out.

* * * * *

UNITED STATES PATENT AND TRADEMARK OFFICE
CERTIFICATE OF CORRECTION

PATENT NO. : 9,988,287 B2  
APPLICATION NO. : 15/128603  
DATED : June 5, 2018  
INVENTOR(S) : Panmin Cai Page 1 of 1

It is certified that error appears in the above-identified patent and that said Letters Patent is hereby corrected as shown below:

In the Drawings

FIG. 2, reference numeral 7: "Alkali Liquor ($N_2OH$)" should read -- Alkali Liquor (NaOH) --.

Signed and Sealed this  
Thirty-first Day of July, 2018

Andrei Iancu  
*Director of the United States Patent and Trademark Office*